United States Patent [19]
Devanagundy et al.

[11] Patent Number: 6,002,737
[45] Date of Patent: Dec. 14, 1999

[54] TIMER USING A SINGLE COUNTER TO TRACK MULTIPLE TIME-OUTS

[75] Inventors: Uday N. Devanagundy, Hayward; Stillman F. Gates, Los Gatos, both of Calif.

[73] Assignee: Adaptec, Inc., Milpitas, Calif.

[21] Appl. No.: 09/089,054

[22] Filed: Jun. 2, 1998

[51] Int. Cl.[6] .................................................. G07C 3/00
[52] U.S. Cl. ............................................. 377/20; 377/16
[58] Field of Search ..................................... 377/2, 16, 20

[56] References Cited

U.S. PATENT DOCUMENTS

| | | | |
|---|---|---|---|
| 5,535,379 | 7/1996 | Koura .......................................... | 377/20 |
| 5,684,997 | 11/1997 | Kau et al. ................................. | 395/733 |
| 5,721,933 | 2/1998 | Walsh et al. ............................. | 395/750 |
| 5,724,399 | 3/1998 | Imalura ...................................... | 377/16 |

*Primary Examiner*—Margaret R. Wambach
*Attorney, Agent, or Firm*—Skjerven, Morrill, MacPherson, Franklin & Friel LLP; David T. Millers

[57] ABSTRACT

A circuit such as a host adapter includes a timer capable of detecting time-outs for multiple pending commands. The timer includes a single free-running counter, a first storage for start counts, a second storage for time-out values, a subtractor, and a comparator. The start counts are counts from the counter that are saved when issuing an associated command. The time-out values indicate the lengths of different types of time-out periods. To check whether a command timed out, a start count associated with the command is selected from the first storage, and the subtractor determines a difference between a current count in the counter and the selected start count. The difference is then compared to a time-out value that is selected from the second storage according to the type of time-out. The command timed out if the difference is greater than the selected time-out value. In one embodiment, the second storage includes count registers for time-out values, a multiplexer, and select register that provides a select signal to the multiplexer. The select register contains a value associated with the command, and the number of count registers matches the number of types of time-outs.

9 Claims, 4 Drawing Sheets

TIMER USING A SINGLE COUNTER TO TRACK MULTIPLE TIME-OUTS

BACKGROUND

1. Field of the Invention

This invention relates generally to circuits such as host adapters that determine whether devices respond before the ends of multiple types of time-out periods, and particularly to timers for such circuits.

2. Description of Related Art

Personal computers use host adapters such as SCSI controllers to control communications with peripheral devices. A host adapter is conventionally on a circuit board that attaches to a system bus such as a PCI bus in a host computer, and peripheral devices connect to the host adapter via a peripheral bus such as a fiber channel bus or a SCSI bus. To control a target device on the peripheral bus, the host adapter sends commands (or requests) to the target peripheral device and then waits for the target peripheral devices to respond. The host adapter, while waiting for a response from one peripheral device, can send other commands to other peripheral devices or to the same peripheral device. Accordingly, the host adapter may be waiting for responses from several different pending commands.

Each command can have one or more different types of time-out period during which host adapter expects a particular type of response. If the peripheral does not respond before the end of a time-out period, an error has occurred which the host adapter must handle error according to the type of time out. Typically, the host adapter either retransmits a command or notifies the host computer that a peripheral device is not responding in the event that the peripheral fails to respond before the time-out. Conventionally, host adapters may have several timers for the multiple pending commands that may have different time-out periods. Such timers typically include a counter that is loaded with an appropriate time-out count when the host adapter sends a command to a peripheral. The counter decrements the time-out count while the host adapter waits for a response. A time-out occurs if the counter decrements the count to zero before the peripheral responds. When an instruction times out, the timer typically sets a control bit corresponding to the type of time out, and the host adapter takes appropriate action for the type of time out.

A problem with conventional timers is that each pending command and each type of time out may require a separate timer. With protocols for peripheral buses now permitting greater numbers of pending transfers and with host adapters controlling a broader spectrum of devices, a large number of commands can be pending and several time out periods must be simultaneously monitored. Providing timers for each time out for each pending command requires circuit area in the host adapter and increases the host adapter's complexity and cost. Accordingly, methods and circuits are sought that can time a large number of pending commands with different time out periods without using a proportionally large amount of circuit area.

SUMMARY

In accordance with the invention, a circuit such as a host adapter includes a timer capable of detecting time-outs for multiple pending commands that have different time-out periods. The timer includes a single free-running counter, a first storage for start counts, a second storage for time-out values, a subtractor, and a comparator. The start counts are counts from the free-running counter that the host adapter saves to the first storage when issuing an associated command. The timeout values indicate the lengths in counter clock cycles of different types of time-out periods. To check whether a command timed out, the host adapter selects from the first storage a start count associated with the command, and the subtractor determines a difference between a current count in the free-running counter and the selected start count. The host also selects from the second storage a time-out value according to the type of time, and the comparator compares to the selected time-out value to the difference from the subtractor. The comparator asserts a signal indicating the command timed out if the difference from the subtractor is greater than the selected time-out value. Thus, a timer with a single comparator can monitor many types or time-out for many instructions.

In one embodiment of the invention, the second storage includes time count registers for time-out values, a multiplexer, and a select register that provides a select signal to the multiplexer. The host adapter loads the select register with a value to select the type of time out being checked. If the comparator asserts a signal indicating a time out, the host adapter can determine the type of time-out from the value in the select register. The total memory requirement for this embodiment of the second storage is relatively small because the size of the select register and number of select bits required for each pending command need only be large enough to identify the time out type. Typically, representing a time-out value requires many more bits. Thus, saving select bits for each pending command rather than time-out values for each pending command reduces memory requirements. The count registers match in number, the number of types of time-outs and contain time-out values that communicating devices agreed to, for example, at log-in in accordance with the fiber channel protocol.

BRIEF DESCRIPTION OF THE DRAWINGS

Use of the same reference symbols in different figures indicates similar or identical items.

DETAILED DESCRIPTION OF THE PREFERRED EMBODIMENTS

In accordance with an aspect of the invention, a timer uses a single free-running counter (FRC) in monitoring multiple overlapping time-out periods that may differ in length. In one embodiment, the timer includes the FRC, storage for start counts, a subtractor, a comparator, and storage for time-out values. In operation, a circuit issuing a command or otherwise starting a time-out period takes a snap-shot of the FRC by saving a current count from the FRC as a start count for the command. The storage for the start counts can be, for example, a memory block associated with the command. Later, to determine if a command timed out, the circuit selects the start count and a time-out value for the command. The subtractor determines the difference between the start count and a current count in the FRC and applies the difference as a first input signal to the comparator. The time-out value for the command is applied as the second input signal of the comparator. The comparator determines whether the difference between the current count and the start count is greater than the time-out value for the command. If so, a time-out period for the command expired. The output signal from the comparator indicates whether a time-out occurred. A circuit using the timer determines the type of time-out base on the time-out value selected for the command.

Figure 1:
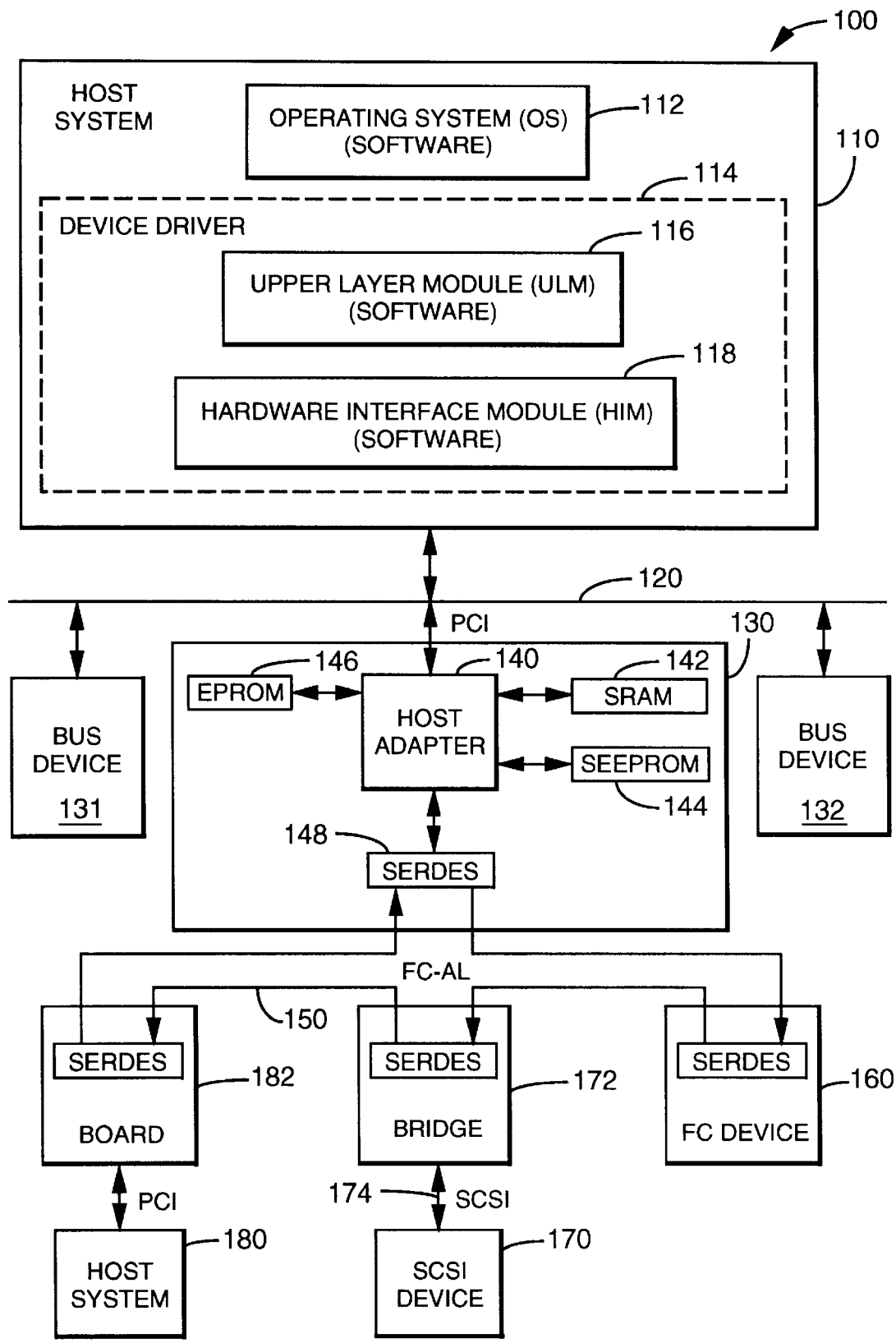
FIG. 1 is a block diagram of a computer system including a system bus, a peripheral bus, and a host adapter in accordance with an embodiment of the invention.

A timer in accordance with the invention is suitable for a host adapter that controls communications with devices on a peripheral bus. FIG. 1 shows a computing system 100 including a host adapter 140 in bus device 130 that controls a peripheral bus 150. Computing system 100 includes a host computer 110, which has system bus devices 130 to 132 connected to a system bus 120. Host computer 110 can communicate via bus device 130, with peripheral devices 160, 170, and 180 that connect to peripheral bus 150. In particular, host computer 110 executes software including an operating system 112 and a device driver 114 for devices 160, 170, and 180. Device driver 114 includes a hardware interface module (HIM) 118 that communicates with device 130 via bus 120 and an upper layer module (ULM) 116 adapted for devices 160, 170, and 180. Host adapter 140 communicates with HIM 118 and sends appropriate commands to devices 160, 170, and 180 on peripheral bus 150.

In an exemplary embodiment of the invention, host computer 110 is a personal computer, system bus 120 is an industry standard peripheral component interconnect (PCI) bus, and bus 150 is a fiber channel (FC) bus. Device 130 is a PCI board in host computer 110. As an example application, devices 160, 170, and 180, which connect to bus 150, are respectively a fiber channel device such as a dick drive, a SCSI device such as a hard drive, a CD ROM drive, or DVD ROM drive which connects to bus 150 via a bridge circuit 172 including a serializer/deserializer, and another computer system 180 having a board 182 for connection and communications via fiber channel bus 150. The protocol for communications, including commands sent to peripheral device 170, are according to standards well known in the art. For example, the fiber channel bus protocol is described in the ANSI publication "Fiber Channel Physical and Signaling Interface (FC-PH)" which is hereby incorporated by reference in its entirety.

Host adapter 140 is a programmable integrated circuit that includes a protocol engine that executes firmware as required to control communications between host computer 110 and devices on bus 150. Host adapter 140 couples to bus 150 via a serializer/deserializer 148. Coupled to host adapter 140 is a local memory including volatile memory 142 and non-volatile memory 144 and 146. The non-volatile memory includes a conventional EPROM, EEPROM or Flash memory 146 and an SEEPROM 144. Non-volatile memory 146 stores a BIOS that host computer 110 uses for device 130. SEEPROM 144 stores configuration information and non-critical information. Volatile memory 142 stores information such as transfer control blocks (TCBs) and scatter/gather (S/G) lists for transfers to and from SCSI device 170, end-to-end credit values, and scratch memory holding page variables and mode variable for the protocol engine. Volatile memory 142 can be any sort of conventional memory such a DRAM or an SRAM. In the exemplary embodiment of the invention, memory 142 is synchronous SRAM that includes one or more 64 k-by-18-bit memory chip. Co-filed U.S. patent application Ser. No. 09/089,044, further describes of a memory architecture suitable for the exemplary embodiment of the invention and is incorporated by reference herein in its entirety.

Figure 2:
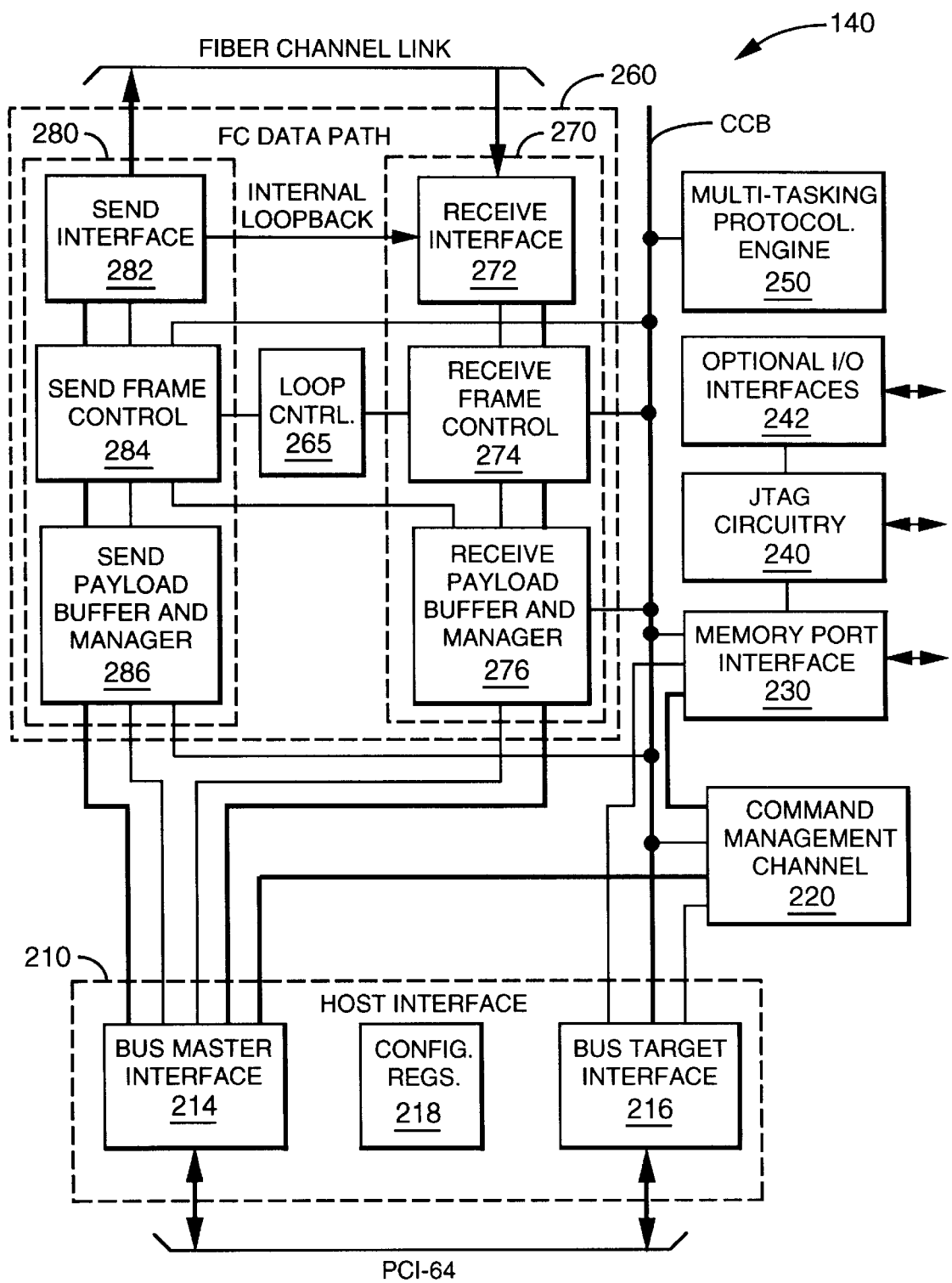
FIG. 2 is a block diagram of the host adapter shown in FIG. 1.

FIG. 2 is a block diagram of the exemplary embodiment of host adapter 140. In the exemplary embodiment, host adapter 140 includes a host interface 210, a command management channel (CMC) 220, a memory port interface (MPI) 230, a multi-tasking protocol engine (MTPE) 250, and a fiber channel data path 260. Host interface 210 connects to system bus 120 and implements PCI bus protocols that permit adapter 140 to act as either the bus master or target. As illustrated in FIG. 2, host interface 210 includes a bus master interface 214 that implements PCI bus protocols for a bus master and a bus target interface 216 that implements the protocols for a target on PCI bus 120. Configuration registers 218 contain configuration data for PCI interface 210 including a device base address, an IRQ, and configuration data for host adapter 140. In alternative embodiments of the invention, host interface 210 can employ any alternative host interface architecture including PCI interface circuits that are known in the art.

Data path 260 is the path for information sent or received via a fiber channel link (i.e., peripheral bus 150). As shown in FIG. 2, data path 260 includes a receive data path 270 for information received from the fiber channel link, a send data path 280 for information to be sent on the fiber channel link, and a loopback control circuit 265 for self-testing. Co-filed U.S. patent application Ser. Nos. 09/089,311, and 09/089,030 further describe the operation of an exemplary embodiment of data path 260 and components therein and are hereby incorporated by reference herein in their entirety.

Command management channel 220 handles DMA transfers and contains a buffer and a DMA control circuit. DMA transfers are between the main memory of the host computer and the buffer in CMC 220 and between the buffer in CMC 220 and local memory 142. Accesses of local memory 142 are through memory port interface 230. Host computer 110 and command management channel 220 store TCBs and S/G lists in local memory 142 via DMA transfers. In the exemplary embodiment of the invention, the buffer in CMC 220 is 128 bytes, and the DMA control circuit handles DMA transfers of blocks up to 128 bytes, which is the size of a standard TCB for the exemplary embodiment of the invention. CMC 220 has a direct connection to memory port interface 230 to facilitate DMA transfers that do not interfere with other communications on a main internal bus CCB. CMC 220 can also access local memory via bus CCB to memory port interface 230.

Bus CCB is a communication bus that connects to host interface 210, CMC 220, memory port interface 230, MTPE 250, and data path 260. Co-filed U.S. patent application entitled "Source-Destination Re-timed Cooperative Communication Bus", Ser. No. 09/088,812 describes a suitable internal bus architecture and is hereby incorporated by reference in its entirety. To access local memory, a module such as MTPE 250 must first acquire control of bus CCB from an arbitrator (not shown). The module can then use an internal address to access a storage location in local memory via memory port interface 230.

Memory port interface 230 provides an interface to local memory including volatile memory 142 and non-volatile memory 144 and 146. Above incorporated U.S. patent application Ser. No. 09/089,044 describes a suitable memory architecture particularly for accessing volatile memory 142. U.S. patent application Ser. No. 09/089,057 further describes a suitable memory port interface for the exemplary embodiment of the invention and is hereby incorporated by reference in its entirety. Memory port interface 230 also controls a test port 240 and other I/O interfaces 242. Test port 240 includes JTAG circuitry for JTAG testing and provides for initiation and output of results of self tests performed within host adapter 140. I/O interfaces 242 implement functions including a general purpose interface, an external request interface, an activity indicator interface, and a monitor interface. The general purpose interface includes generic, addressable pins for input and output signals. The external request interface provides for an external pause request and acknowledge for Peek/Poke operations, a firmware load request and acknowledge, and an external interrupt of host adapter 140. The activity indicator interface is an LED indicator output port for indicating the activity of host adapter 140. The monitor interface allows selection of internal signals from within host adapter 140 for external monitoring. The monitor port interface is generally for debugging of host adapter 140 during initial design and testing. Co-filed U.S. patent application Ser. No. 09/089,278 describes a monitor port suitable for the exemplary embodiment of the invention and is hereby incorporated by reference in its entirety. Interfaces 240 and 242, while useful, are not required and can be omitted. Additionally, other types of interfaces can be added according to the functions and desired testing of adapter 140.

MTPE 250 is a sequencer that controls information transfers such as defined by transfer control blocks (TCBs) and scatter/gather (S/G) lists in local memory. MTPE 250 executes software that controls communications with peripheral devices through data path 260 and is multi-tasking in that MTPE 250 can control multiple simultaneously pending transfers. To initiate communications such as a data transfer, MTPE sends a command to a target device through send data path 280 and waits for a response from the target device. In accordance with an aspect of the invention, MTPE 250 includes a multiple command timer for checking the a variety of different time-out conditions of multiple pending commands.

Figure 3:
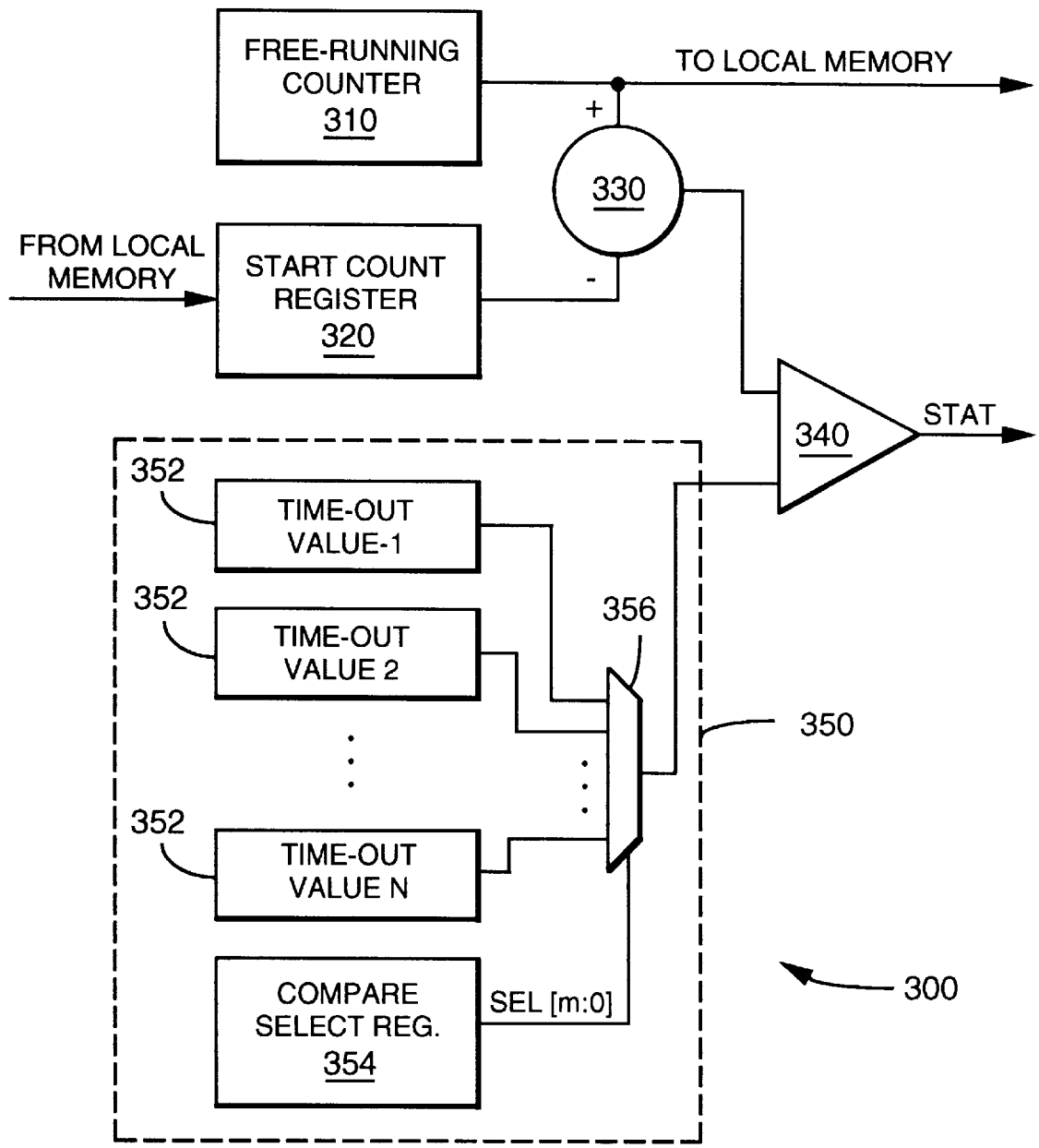
FIG. 3 is a block diagram of a timer in accordance with an embodiment of the invention.

FIG. 3 shows a block diagram of a multiple command timer 300 in accordance with an embodiment of the invention. Timer 300 includes a free-running counter 310, a start count register 320, a subtractor 330, a comparator 340, and storage 350 for time-out values. Output ports of counter 310 and register 320 connect to input ports of subtractor 330, which generates a multi-bit difference signal. Comparator 340 is a multi-bit comparator that compares the difference from subtractor 330 to a time-out value from storage 350 and generates a binary signal STAT indicating whether the difference is greater than the time-out value. Alternatively, comparator 340 asserts signal STAT to indicated whether the difference is greater than or equal to the time-out value.

The embodiment of storage 350 shown in FIG. 3 includes registers 352 which contain time-out values for N types of time-out periods. Each time-out value indicates the number of counter clock cycles in an associated time-out period. The time-out values are typically agreed to at log-in of devices, for example, at the initiation of communications on a fiber channel bus. The agreed time-out values for different types of time-outs are written to registers 352. For example, the fiber channel protocol specifies three types of time out periods, a "Receiver-Transmitter" time-out, an "Error Detect" time-out, and a "Resource Allocation" time-out. Output ports of registers 352 connect to input ports of a multiplexer 356 which receives a select signal SEL[m:0] from a select register 354. A select value in register 354 thus selects which of the time-out values from registers 352 multiplexer 356 provides to comparator 340. In the exemplary embodiment of the invention, one timer handles two types of time-outs, the Error Detect time-out (EDTOV) and the Resource Allocation time-out (RATOV). Accordingly, in the exemplary embodiment of the invention, a select value is a single bit in register 354 that selects one or the other type of time-out. MTPE 250 controls the select value in register 354 to select the appropriate time-out value for the command currently being processed. MTPE 250 can poll signal STAT to detect whether the command timed out. Alternatively, comparator 340 asserting signal STAT issues a notice or an interrupt of MTPE 250. If comparator 340 asserts signal STAT, MTPE 250 can determine the type of time-out from the select value in register 354.

In an alternative embodiment of the invention, storage 350 is a single register that contains the time-out value that is applied to comparator 340, and MTPE 250 writes the appropriate time-out value to the register when required for checking a time-out condition. In another alternative embodiment, storage 350 is a section of memory, and MTPE 250 provides an address for the appropriate time-out value when required for checking a time-out condition.

Counter 310 starts at reset of the host adapter and runs continuously. In the exemplary embodiment of the invention, counter 310 is a 32-bit counter that is clocked with a 1-KHz counter clock signal. According, the count in counter 310 indicates a time with a resolution of about 1 ms, and counter 310 can count for several hours before rolling over. The period required for counter 310 to roll over is thus much larger than the largest required time-out period (2 min.). When MTPE 250 sends a command to a device on the peripheral bus, MTPE 250 stores the current count from counter 310 as a start count of the just issued command. MTPE 250 can also store a select value for the command. However, MTPE 250 uses the select value for selecting which time-out value (EDTOV or RATOV) is compared to the elapsed time, and MTPE 250 may be able to select the correct time-out value without storing the select value for the command. MTPE 250 writes the start count and select value at locations in local memory associated with the command.

MTPE 250 is a multi-tasking processor that switches from one transfer task to another. When resuming a task for which a command has been sent but no reply received, MTPE 250 selects or loads the start count for the command in start count register 320, and subtractor 330 determines the difference between the current count in counter 310 and the start count saved when the command was issued. The resulting difference is not accessible to MTPE 250 but is the time in counter clock cycles that the host adapter has waited for a response. When resuming or changing tasks, MTPE 250 also selects or loads a select value in register 354, and storage 350 provides the appropriate time-out value for the command to comparator 340. If the difference from subtractor 330 is greater than the time-out value from storage 350, comparator 340 asserts signal STAT to indicate that the command has timed out. Signal STAT either interrupts MTPE 250, or MTPE 250 detect the time-out by polling a control bit corresponding to signal STAT.

In the exemplary embodiment of the invention, signal STAT is a bit in a control register, and MTPE 250 writes the start count and a select value into registers 320 and 354, respectively, when issuing a command. Comparator 340 continually keeps signal STAT and the associated control bit at the correct value to indicate whether a time-out has occurred for the command associated with the values in registers 320 and 354. To handle multiple pending commands, the fixed logical addresses that MTPE 250 uses for registers 320 and 354 map to different storage locations at different times. This changes which storage locations correspond to registers 320 and 354, and comparator 340 generates signal STAT based on the values in the newly selected storage locations. When MTPE 250 resumes working on a command, MTPE 250 changes operating mode so that registers 350 and 354 again correspond to the original storage locations and provide the values associated with the command.

Several advantages of multiple counter 300 may be noted. First, N different types of time-outs or commands can be distinguishes using $\log_2 N$ selection bits in register 354 and N time-out values in registers 352. Thus, the number of bits stored per issued command is less than if a time-out value was saved along with the start count for each command. Second, a single comparator can generate the time-out signals for several types of different time-outs. More conventional time systems require a separate comparator and status bit for each type of time-out. Third, counter 300 does not limit the number of pending commands. If local memory is sufficient for storing the required start counts and selection values, multiple commands can be sequentially checked for time-outs by selecting or loading the start counts and selection values in registers 320 and 354 and waiting for signal STAT to settle.

Figure 4:
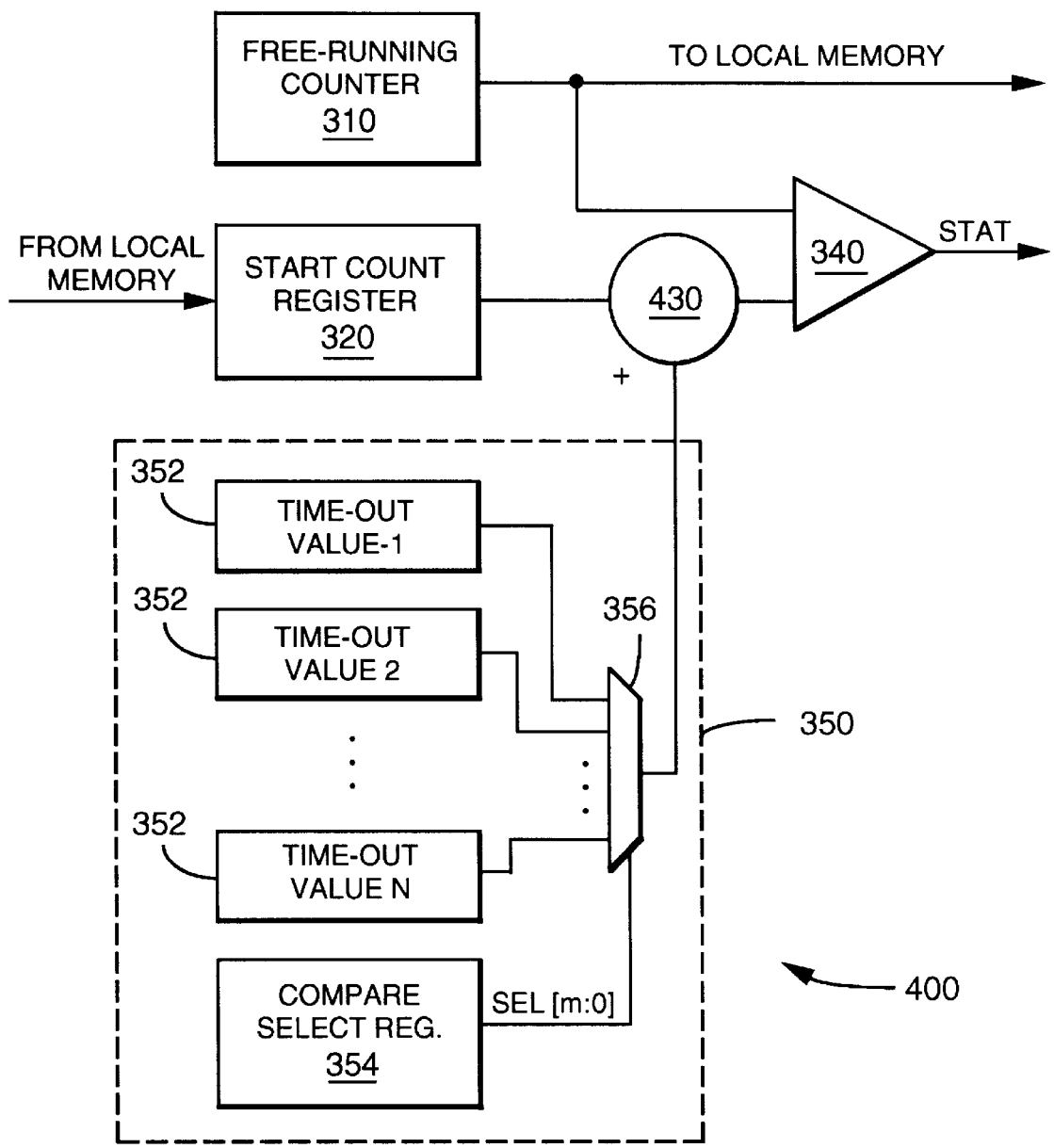
FIG. 4 is a block diagram of a timer in accordance with another embodiment of the invention.

Although the invention has been described with reference to particular embodiments, the description is only an example of the invention's application and should not be taken as a limitation. For example, FIG. 3 illustrates an embodiment of the invention where subtractor determines a difference between the current count and comparator 340 determines whether the difference is greater than a timeout value from storage 350. Alternatively, other mathematical relationships among the current count, the start count, and the time-out value can be used to obtain the same time-out signal. For example, FIG. 4 shows a timer 400 which uses an adder 430 that adds a time-out value from storage 350 to the start count from register 320. Comparator 340 then determines whether the current count is greater than (or greater than or equal to) the sum from adder 430. Various adaptations and combinations of features of the embodiments disclosed are within the scope of the invention as defined by the following claims.

We claim:

1. A circuit comprising:
   a free-running counter;
   a first storage for start counts;
   a second storage for time-out values; and
   an arithmetic unit coupled to determine an arithmetic combination of output signals from two of the free-running counter, the first storage, and the second storage;
   a comparator coupled to the arithmetic unit and one of the free running counter, the first storage, and the second storage, wherein the comparator generates a signal indicating a result of comparing the arithmetic combination and an output signal from the one of the free running counter, the first storage, and the second storage that is coupled to comparator.

2. The circuit of claim 1, wherein the second storage comprises:
   a multiplexer;
   a plurality of registers coupled to input ports of the multiplexer, each register storing a time-out value; and
   a select register connected to apply a select signal to the multiplexer, wherein the select signal selects which time-out value from the plurality of registers, the multiplexer provides to the comparator.

3. The circuit of claim 1, further comprising a processing engine coupled to save in the first storage, a count from the free-running counter when the processing engine issues a command.

4. The circuit of claim 3, wherein the processing engine selects the first start count from the first storage when checking whether the command timed out.

5. The circuit of claim 1, further comprising a processing engine coupled to save in the first storage a plurality of counts from the free-running counter, wherein the processing engines saves each of the plurality of counts when issuing a command associated with the count.

6. The circuit of claim 3, wherein the processing engine selects the first start count from the first storage when checking whether the command associated with the first time-out value timed out.

7. The circuit of claim 1, wherein the arithmetic unit comprises a subtractor coupled to the free running counter and the first storage, and the subtractor and the second storage are coupled to input terminals of the comparator.

8. A method for monitoring time-out conditions, comprising:
   operating a counter to continuously count;
   saving a plurality of counts that are associated with a plurality of issued commands, wherein each count is in the counter when each command associated with each count is issued; and
   checking for a time-out for a first command from the plurality of issued commands, wherein checking for the time-out comprises:
   subtracting a first of the plurality of counts from a current count which is in the counter when checking for the time-out of the first command, the first count being associated with the first command;
   comparing a first time-out value that corresponds to the first command to a difference between the current count and the first count; and
   determining, based on a result of the comparing step, whether the first command timed out.

9. The method of claim 8, wherein checking for the time out further comprises selecting the first time-out value from a plurality of time-out values, wherein each of the time-out values corresponds to a different type of time-out.

* * * * *